US010111123B2

(12) United States Patent
Rune et al.

(10) Patent No.: US 10,111,123 B2
(45) Date of Patent: Oct. 23, 2018

(54) RELAXED MEASUREMENT REPORTING WITH CONTROL PLANE DUAL CONNECTIVITY

(71) Applicant: Telefonaktiebolaget L M Ericsson (publ), Stockholm (SE)

(72) Inventors: Johan Rune, Lidingö (SE); Icaro L. J. da Silva, Bromma (SE); Gunnar Mildh, Sollentuna (SE); Jari Vikberg, Järna (SE); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 197 days.

(21) Appl. No.: 14/650,954

(22) PCT Filed: Apr. 30, 2015

(86) PCT No.: PCT/SE2015/050485
§ 371 (c)(1),
(2) Date: Jun. 10, 2015

(87) PCT Pub. No.: WO2016/175690
PCT Pub. Date: Nov. 3, 2016

(65) Prior Publication Data
US 2017/0150384 A1    May 25, 2017

(51) Int. Cl.
H04W 24/10 (2009.01)
H04W 72/08 (2009.01)
(Continued)

(52) U.S. Cl.
CPC ......... *H04W 24/10* (2013.01); *H04W 72/085* (2013.01); *H04W 36/0088* (2013.01);
(Continued)

(58) Field of Classification Search
CPC ... H04W 24/10; H04W 76/025; H04W 88/06; H04W 36/30
See application file for complete search history.

(56) References Cited

U.S. PATENT DOCUMENTS 6,005,852 A    12/1999  Kokko et al.
6,236,860 B1    5/2001  Hagting et al.
(Continued)

FOREIGN PATENT DOCUMENTS

EP    2755429 A1    7/2014
EP    2833669 A1    2/2015
(Continued)

OTHER PUBLICATIONS

Da Silva, Icaro et al., "Tight integration of new 5G air interface and LTE to fulfill 5G requirements", 2015 IEEE, 2015, 1-5.
(Continued)

*Primary Examiner* — Jung Park
(74) *Attorney, Agent, or Firm* — Murphy, Bilak & Homiller, PLLC

(57) ABSTRACT

The disclosure relates to reporting measurements and in particular to relaxed measurement reporting when the wireless device is using multiple radio links for the control plane. The disclosure relates to methods of reporting measurement and of controlling reporting of measurements, as well as to devices and computer programs configured thereto. According to some aspects the disclosure relates to a method, performed in a wireless device in a wireless communication system, for reporting measurements. The method comprising receiving S1, from a radio network node, information defining at least one further measurement report setting for measurement reporting in a control plane multi connectivity mode; wherein the at least one further measurement report setting corresponds to a more relaxed measurement reporting than a first measurement report setting for measurement (Continued)

reporting in a control plane single connectivity mode, which is available to the wireless device, selecting S2 one of the first and further measurement report settings based on a determination of a control plane connectivity mode of the wireless device; wherein the wireless device is in the control plane multi connectivity mode when the wireless device is using multiple radio links for the control plane and reporting S4, to the radio network node, measurements in accordance with the selected measurement report setting.

14 Claims, 11 Drawing Sheets

(51) Int. Cl.
  *H04W 88/06* (2009.01)
  *H04W 76/04* (2009.01)
  *H04W 36/00* (2009.01)
  *H04W 76/27* (2018.01)

(52) U.S. Cl.
  CPC .......... *H04W 76/046* (2013.01); *H04W 76/27* (2018.02); *H04W 88/06* (2013.01)

(56) References Cited

U.S. PATENT DOCUMENTS

| | | | |
|---|---|---|---|
| 7,016,321 B1 | 3/2006 | Park et al. | |
| 7,308,023 B1 | 12/2007 | Blair et al. | |
| 8,634,353 B2 | 1/2014 | Teague et al. | |
| 9,088,509 B1 | 7/2015 | Sella et al. | |
| 2002/0105906 A1 | 8/2002 | Marjelund et al. | |
| 2003/0103520 A1 | 6/2003 | Chen et al. | |
| 2005/0147030 A1 | 7/2005 | Lenzini et al. | |
| 2007/0211660 A1 | 9/2007 | Teague et al. | |
| 2007/0258405 A1 | 11/2007 | Kim et al. | |
| 2008/0037470 A1 | 2/2008 | Kim et al. | |
| 2008/0133995 A1 | 6/2008 | Lohr et al. | |
| 2011/0119548 A1 | 5/2011 | Imamura et al. | |
| 2012/0269137 A1 | 10/2012 | Kang et al. | |
| 2013/0262915 A1 | 10/2013 | Frank et al. | |
| 2013/0303203 A1 | 11/2013 | Wang et al. | |
| 2014/0153390 A1 | 6/2014 | Ishii et al. | |
| 2014/0220974 A1 | 8/2014 | Hsu | |
| 2015/0016381 A1 | 1/2015 | Kaikkonen et al. | |
| 2015/0016390 A1 | 1/2015 | McBeath et al. | |
| 2015/0023269 A1 | 1/2015 | Lee et al. | |
| 2015/0043479 A1 | 2/2015 | Kitazoe et al. | |
| 2015/0063166 A1 | 3/2015 | Sif et al. | |
| 2015/0296481 A1 | 10/2015 | Yu et al. | |
| 2015/0355919 A1 | 12/2015 | Gatherer et al. | |
| 2015/0373559 A1 | 12/2015 | Hong | |
| 2016/0007237 A1* | 1/2016 | Jung | H04L 41/0816 455/438 |
| 2016/0036541 A1* | 2/2016 | Siomina | H04B 17/345 455/422.1 |
| 2016/0112149 A1* | 4/2016 | Kim | H04B 17/309 370/252 |
| 2016/0227514 A1 | 8/2016 | Burbidge et al. | |
| 2016/0330680 A1* | 11/2016 | Yi | H04W 48/16 |
| 2017/0055202 A1* | 2/2017 | Uchiyama | H04W 48/16 |
| 2017/0070312 A1* | 3/2017 | Yi | H04J 11/0069 |

FOREIGN PATENT DOCUMENTS

| | | |
|---|---|---|
| WO | 2009158626 A1 | 12/2009 |
| WO | 2012140470 A1 | 10/2012 |
| WO | 2014021761 A2 | 2/2014 |
| WO | 2014166050 A1 | 10/2014 |
| WO | 2016074702 A1 | 5/2016 |
| WO | 2016099369 A1 | 6/2016 |
| WO | 2016130061 A1 | 8/2016 |
| WO | 2017534222 A | 11/2017 |

OTHER PUBLICATIONS

Frenger, Pål et al., "A Clean Slate Radio Network Designed for Maximum Energy Performance", 2014 IEEE, 2014, 1-5.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

Unknown, Author, "Relaxed Measurements for Inter-frequency Cell Search", 3GPP TSG-RAN WG4 Meeting #70 R4-140761, Prague, Czech Republic, Feb. 10-14, 2014, 1-5.

Unknown, Author, "ETSI GS NFV 002 V1.1.1", Network Functions Virtualisation (NFV); Architectural Framework, Oct. 2013, pp. 1-21.

* cited by examiner

Protocol Architecture for SRB Diversity

S1
Receiving information defining a first measurement report for measurement reporting in a control plane single connectivity mode and at least one further measurement report setting for measurement reporting in a control plane multi connectivity mode > and receiving (S1b) information defining rules defining when to apply the further measurement report settings > and obtaining (S1c) predefined rules defining when to apply the first and further measurement report settings

S2
Selecting one of the measurement report settings for use when reporting measurements based on a determination of whether the wireless device is in the control plane multi connectivity mode; wherein the wireless device is in the control plane multi connectivity mode when the wireless device has multiple radio links for control plane connection > S3
> Pperforming measurements in accordance with the selected measurement report settings

S4
Reporting, to the network node, measurements in accordance with the selected measurement report setting

Fig. 8

S11a
Determining whether the wireless device is in the control plane multi connectivity mode; wherein the wireless device is in the control plane multi connectivity mode when the wireless device has multiple radio links for the control plane connection

S12
Sending, to a wireless device, information defining at least one further measurement report setting corresponding to a control plane multi connectivity mode; wherein the at least one further measurement report setting corresponds to more relaxed measurement reporting than a first measurement report setting corresponding to a control plane single connectivity mode and thereby configuring (S12a) the wireless device with the one or more further measurement report settings, for use when reporting (S3) measurements, based on the determination

S13
Receiving measurements in accordance with the at least one further measurement report settings

Fig. 9

RELAXED MEASUREMENT REPORTING WITH CONTROL PLANE DUAL CONNECTIVITY

TECHNICAL FIELD

The disclosure relates to reporting measurements and in particular to relaxed measurement reporting when the wireless device is using multiple radio links for the control plane. The disclosure relates to methods for reporting measurements and for controlling reporting of measurements, as well as to devices and computer programs configured thereto.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Evolved UTRAN, E-UTRAN, is the radio access network of an LTE system. In an E-UTRAN, a User Equipment, UE, is wirelessly connected to a Radio Base Station, RBS, commonly referred to as an evolved NodeB, or eNodeB. An RBS is a general term for a radio network node capable of transmitting radio signals to a UE and receiving signals transmitted by a UE.

In 5G, i.e. 5th generation mobile networks, there will be evolvement of the current LTE system to 5G. One task for 5G is to improve throughput and capacity compared to LTE. This is achieved by increasing the sample rate and bandwidth per carrier. 5G is also focusing on the use of higher carrier frequencies i.e. above 5-10 GHz.

By carrier aggregation, CA, the LTE standard supports efficient use of multiple carriers, allowing data to be simultaneously sent and received over several different carrier frequencies i.e. frequency bands. There is also support for cross-carrier scheduling avoiding the need that the UE listen to all carrier-scheduling channels all the time. The CA solution relies on tight time synchronization between the carriers.

To enable similar benefits as in carrier aggregation also for cases where different base stations and/or antenna sites are used with relaxed backhaul latency requirements, 3GPP initiated work labeled LTE dual connectivity. LTE dual connectivity is a solution currently being standardized by 3GPP to support UEs connecting to multiple carriers to send/receive data on multiple carriers corresponding to different base stations and/or antenna sites, at the same time.

The Dual Connectivity solution standardized in Release 12 can enable additional possible features, such as Control Plane Diversity (or RRC diversity).

The Radio Resource Control (RRC) protocol handles the control plane signaling of layer 3 between the UEs and the E-UTRAN. RRC includes e.g. functions for broadcast of system information and mobility procedures e.g. handover.

There can only be one RRC connection open to a UE at any one time. However, the messages of the connection may anyhow be transmitted via different base stations on lower layers. Therefore, introduction of RRC diversity has been discussed within the LTE release 12 time frame. RRC diversity is a technique to enable the communication of RRC messages to a user equipment, UE, via anchor link and booster link. The general idea for RRC diversity downlink signaling is that control messages are signaled from both an anchor eNodeB and a booster eNodeB.

Benefits from RRC Diversity have also been reported for inter-frequency scenarios in LTE, mainly when one of the frequency layers had coverage issues. This inter-frequency scenario can easily be extended for 5G Dual Connectivity, where it is expected that one of the links will be on LTE and another on the new 5G air interface, possibly operating in much high frequencies (up to 10 Ghz, or in extreme cases 30 Ghz or 60 GHz). In that case, this higher frequency link is sometimes expected to have spotty coverage due to challenging propagation conditions. Considering that for 5G, reliability requirements will be tougher, some sort of RRC Diversity is very likely to be considered.

However, the existing concepts for dual connectivity do not fully exploit the potential benefits of dual connectivity and in particular the potential benefits enabled by dual connectivity for control signaling.

Hence, there is a need for solution further exploiting the benefits of dual connectivity.

SUMMARY

The present disclosure presents a method performed in a wireless device in a wireless communication system, for reporting measurements. The method comprise receiving, from a radio network node, information defining at least one further measurement report setting for measurement reporting in a control plane multi connectivity mode; wherein the at least one further measurement report setting corresponds to a more relaxed measurement reporting than a first measurement report setting for measurement reporting in a control plane single connectivity mode, which is available to the wireless device. The method further comprises selecting one of the first and further measurement report settings based on a determination of a control plane connectivity mode of the wireless device, wherein the wireless device is in the control plane multi connectivity mode when the wireless device is using multiple radio links for the control plane and reporting, to the radio network node, measurements in accordance with the selected measurement report setting.

Embodiments of the proposed solution better exploits the potential benefits of dual connectivity, by relaxing the measurement reporting when the wireless device uses dual connectivity for the control signaling. By reducing the number of measurement reports, energy can be saved in the wireless device and radio resources may be more efficiently utilized. In addition, interference, in particular inter-cell interference, may be reduced and some unnecessary handovers may be avoided.

According to some aspects, the selecting implies selecting one of the at least one further measurement report settings if the difference between the latency of the radio links for the control plane is above a threshold. The reason is that the gain may be further reduced if the latency differs a lot between the two accesses used for dual connectivity. Thus, whenever a new air interface for 5G, is available, this access should be used for the user plane, if the throughput is to be optimized, and (preferably fast) handover to LTE should be used whenever the 5G RAN access is lost.

According to some aspects, the selecting is based on at least one further criterion. Hence, the measurement reporting may only be different or relaxed when other relevant circumstances are also favorable.

According to some aspects, the information comprises rules defining when to apply the first and further measurement report settings. Thus, the wireless device may also receive information defining when to apply the settings.

According to some aspects, the disclosure relates to a wireless device configured to receive, from a radio network node, information defining at least one further measurement report setting for measurement reporting in a control plane multi connectivity mode; wherein the at least one further measurement report setting corresponds to a more relaxed measurement reporting than a first measurement report setting for measurement reporting in a control plane single connectivity mode, which is available to the wireless device, to select one of the first and further measurement report settings based on a determination of a control plane connectivity mode of the wireless device; wherein the wireless device is in the control plane multi connectivity mode when the wireless device is using multiple radio links for the control plane and to report, to the radio network node, measurements in accordance with the selected measurement report setting.

According to some aspects, the disclosure relates to a method, performed in a radio network node, for controlling measurement reporting. The method comprises sending, to a wireless device, information defining at least one further measurement report setting for measurements in a control plane multi connectivity mode. The at least one further measurement report setting corresponds to a more relaxed measurement reporting than a first measurements report setting for measurement reporting in a control plane single connectivity mode, which is available to the wireless device.

According to some aspects, the disclosure relates to network node configured to send, to a wireless device, information defining at least one further measurement report setting for measurements in a control plane multi connectivity mode. The at least one further measurement report setting corresponds to more relaxed measurement reporting than a first measurements report setting for measurement reporting in a control plane single connectivity mode, which is available to the wireless device.

With the above description in mind, the object of the present disclosure is to overcome at least some of the disadvantages of known technology as described above and below.

BRIEF DESCRIPTION OF THE DRAWINGS

FIG. 8 is a flowchart illustrating embodiments of method steps executed in a wireless device according to some aspects of the disclosure.

FIG. 9 is a flowchart illustrating embodiments of method steps executed in a network node according to one aspect of the disclosure.

DETAILED DESCRIPTION

Figure 1A:
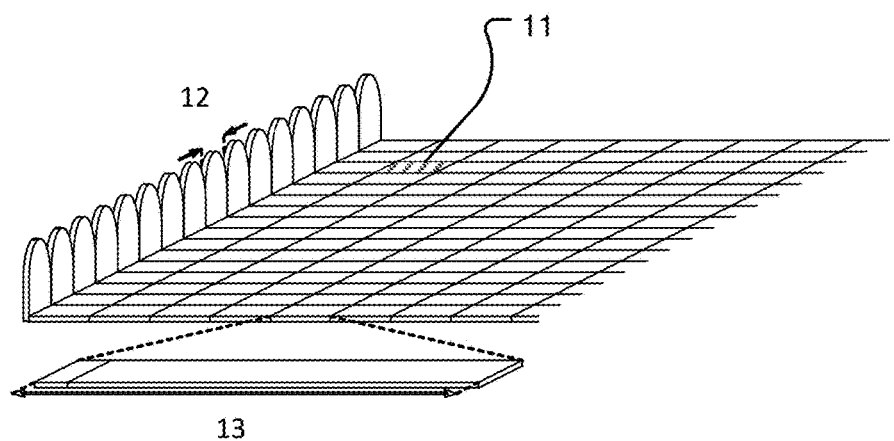
FIG. 1a illustrates the LTE downlink physical resource configuration.

One of the drawbacks associated with dual connectivity is the increased amount of measurements that a wireless device, in LTE referred to as a UE, has to perform since there can be multiple radio links to be monitored and the wireless device needs to perform the measurements for each radio link.

In a 5G implementation, the increased amount of inter-frequency measurements the UE has to perform will also be an issue when the dual connectivity involves access nodes of different Radio Access Technology, RATs.

Furthermore, a new mobility paradigm for 5G based on beam switching with RRC Diversity will not only generate an increased amount of inter- and intra-frequency measurements the UE has to perform per beam, but there is also a risk of unnecessary mobility reference signal activations, i.e. reference signals that are not needed for measurements, being triggered, which creates unnecessary signaling over an inter-node interface and unnecessary interference and energy consumption in the unnecessarily activated beams.

This disclosure proposes to leverage fast user plane re-establishment enabled by control plane dual connectivity, in particular for the RRC layer to save UE energy and radio resources and reduce interference by introducing different measurement report settings for a UE, resulting in fewer measurement reports (and potentially fewer measurements).

In this disclosure the terminology user plane and control plane is used throughout. A plane, in a networking context, is one of three integral components of a telecommunications architecture. The data plane, the control plane and the management plane can be thought of as different areas of operations. Each plane carries a different type of traffic. The data plane (sometimes known as the user plane, forwarding plane, carrier plane or bearer plane) carries the network user traffic. The control plane carries signaling traffic.

For example, when entering dual connectivity mode for the RRC connection for a UE, the base station maintaining the RRC context (e.g. an eNodeB) reconfigures the measurement reporting for the UE, so that a more relaxed measurement reporting is achieved. Such a relaxed configuration may e.g. impact configuration aspects such as thresholds for report triggering, time to trigger (TTT), report frequency and selected measurement objects. Optionally, the relaxed measurement report configuration may also be subject to other potentially relevant circumstances, such as UE closeness to cell borders, historical patterns of radio link failures, movement speed of the UE and variability of reported measurement values.

Hence, the proposed solution addresses the area of handover and in particular the measurement reports sent by the UE to provide the network (typically base stations) with the radio signal strength/quality information that it needs to determine whether to initiate a handover of the UE to another cell or access node. Such measurement reporting is, as many features in a cellular network, designed based on a trade-off between advantages and disadvantages. The advantages of measurement reporting and in particular frequent such reports, include that the base station serving the UE and receiving the reports can accurately track the signal strength/quality perceived by the UE, which enables the base station to, with a high probability, perform a handover of the UE before the radio channel quality deteriorates so much that the UE loses the connection and/or fails to execute a necessary handover. Seriously taking into account the sometimes rather fast changing quality of the radio channel and the significant consequences of handover failure (in terms of lost connection and poor user experience), the measurements are performed rather frequently and the conditions for measurement reporting are often generous, resulting in relatively frequent measurements and reporting. The disadvantages are that this taps the energy reserves of the UE, occupies transmission resources, increases interference and prevents the UE from optimal utilization of its time and resources, especially so in inter-frequency and inter-RAT scenarios where measurement gaps are needed.

A brief introduction to the LTE radio interface will now be given as background information.

LTE Radio Interface

LTE uses Orthogonal Frequency Division Multiplexing, OFDM, in the downlink and DFT-spread OFDM (a.k.a. SC-FDMA) in the uplink. The basic LTE downlink physical resource can thus be seen as a time-frequency grid as illustrated in FIG. 1a, where each resource element 11 corresponds to one OFDM subcarrier 12 during one OFDM symbol interval 13. Furthermore, the resource allocation in LTE is typically described in terms of resource blocks, RB, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks, VRB, and physical resource blocks, PRB, has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain thereby providing frequency diversity for data channel transmitted using these distributed VRBs.

Figure 1B:
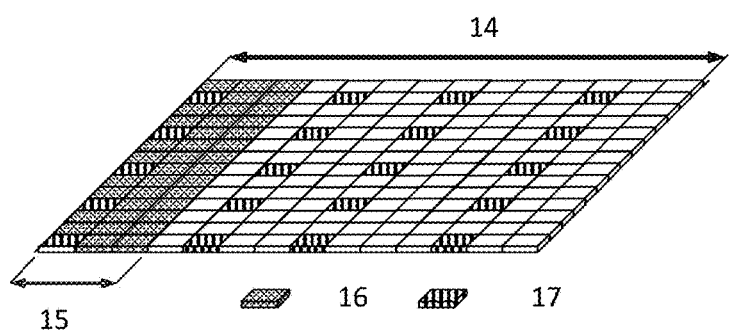
FIG. 1b illustrates the LTE time-domain structure.

In LTE, downlink transmissions are dynamically scheduled, i.e. in each subframe 13 an eNodeB transmits control information about to which terminals data is transmitted and upon which resource blocks the data is transmitted, in the current downlink subframe. Control signaling 15 in LTE is illustrated in FIG. 1b.

This control signaling 15 is typically transmitted in the first 1, 2, 3 or 4 OFDM symbols in each subframe and the number n=1, 2, 3 or 4 is known as the Control Format Indicator, CFI. The downlink subframe also contains common reference symbols (CRS) 16, which are known to the receiver and used for coherent demodulation of e.g. the control information. In FIG. 1b, CFI=3 OFDM symbols.

An overview of the dual connectivity concept will now be given.

Dual Connectivity

Dual Connectivity is operation where a given wireless device consumes radio resources provided by two different network points (Master and Secondary eNodeBs) connected with non-ideal backhaul while in RRC_CONNECTED. LTE Release 12 supports dual connectivity for the user plane but not for the control plane.

In E-UTRAN dual connectivity operation a UE in RRC_CONNECTED is configured to utilize radio resources provided by two distinct schedulers, located in two different eNodeBs connected via a non-ideal backhaul over the X2 interface. eNodeBs involved in dual connectivity for a certain UE may assume two different roles a Master eNodeB, MeNB, or a Secondary eNodeB, SeNB. In dual connectivity the UE is connected to one MeNB and one SeNB.

The group of the serving cells associated with the MeNB is referred to as the Master Cell Group. The Master eNodeB is the eNodeB which terminates at least the so called S1-MME interface and therefore acts as mobility anchor towards the Core Network. The group of the serving cells associated with the SeNB is referred to as the Secondary Cell Group, SCG.

In dual connectivity, the radio protocol architecture that a particular bearer uses depends on how the bearer is setup. Three alternatives exist, MCG bearer, SCG bearer and split bearer. The bearer variants will be further described in FIG. 3a.

Figure 2A:
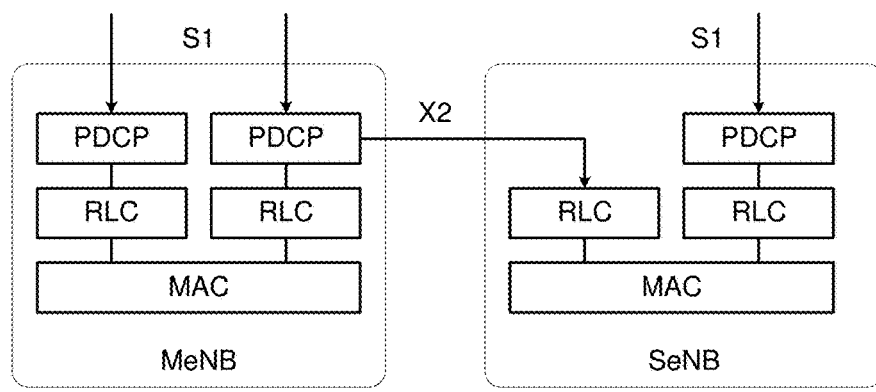
FIG. 2a illustrates radio protocol architecture for Dual Connectivity

FIG. 2a shows a radio user plane protocol architecture that enables all three alternatives. In LTE Signaling Radio Bearers, SRB, are used for the transfer of Radio Resource blocks, RRC, and Non Access Stratum, NAS, signaling messages, or in other words the control plane signaling. In Release 12 the Signaling Radio Bearer, SRBs, are always of the MCG bearer and therefore only use the radio resources provided by the MeNB. Note that dual connectivity can also be described as having at least one bearer configured to use radio resources provided by the SeNB.

Inter-eNodeB control plane signaling for dual connectivity is performed by means of X2 interface signaling. Control plane signaling towards the MME is performed by means of S1 interface signaling. There is only one S1-MME connection per UE between the MeNB and the MME. Each eNodeB should be able to handle UEs independently, i.e. provide the Primary Cell to some UEs while providing Secondary Cell(s) for SCG to others. Each eNodeB involved in dual connectivity for a certain UE owns its radio resources and is primarily responsible for allocating radio resources of its cells. Any required coordination between MeNB and SeNB is performed by means of X2 interface signaling.

Figure 2B:
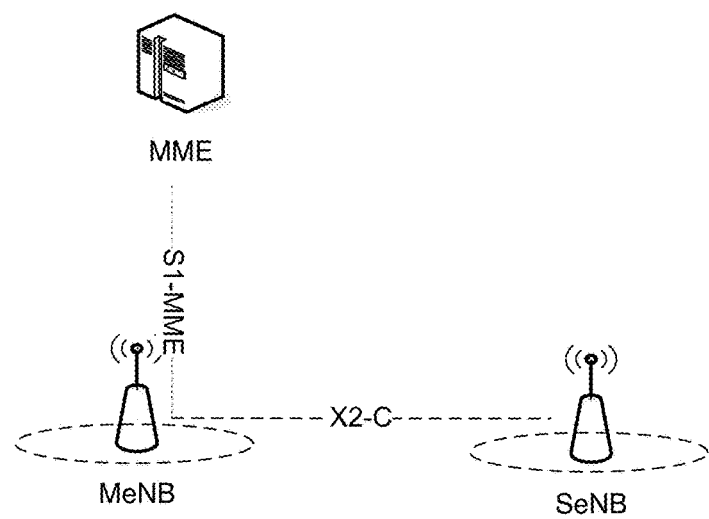
FIG. 2b illustrates control plane connectivity of eNodeBs involved in dual connectivity.

FIG. 2b shows C-plane (control plane) connectivity of eNodeBs involved in dual connectivity for a certain UE. The MeNB is C-plane connected to the MME via S1-MME, the MeNB and the SeNB are interconnected via X2-C.

Figure 3A:
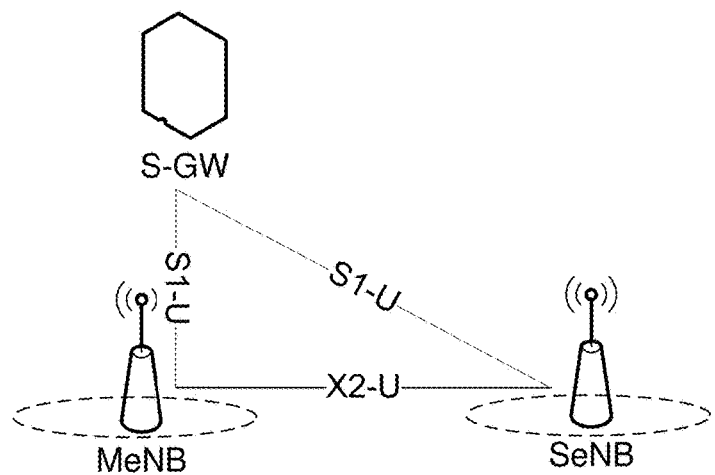
FIG. 3a illustrates user plane connectivity of eNodeBs involved in dual connectivity.

FIG. 3a shows U-plane (user plane) connectivity of eNodeBs involved in dual connectivity for a certain UE (not shown). The U-plane connectivity depends on the bearer option configured as follows:

For MCG bearers, the MeNB is U-plane connected to the S-GW via S1-U, the SeNB is not involved in the transport of user plane data.

For split bearers, the MeNB is U-plane connected to the S-GW via S1-U and in addition, the MeNB and the SeNB are interconnected via X2-U.

For SCG bearers, the SeNB is directly connected with the S-GW via S1-U.

Hence, the dual connectivity of LTE Release 12, e.g. as described in 3GPP TS 36.300 version 12.3.0 Release 12, makes it possible to send/receive data over all LTE carriers, without requiring tight time synchronization as in Carrier Aggregation. This is enabled because the UE will listen to all scheduling channels on all carriers.

Figure 3B:
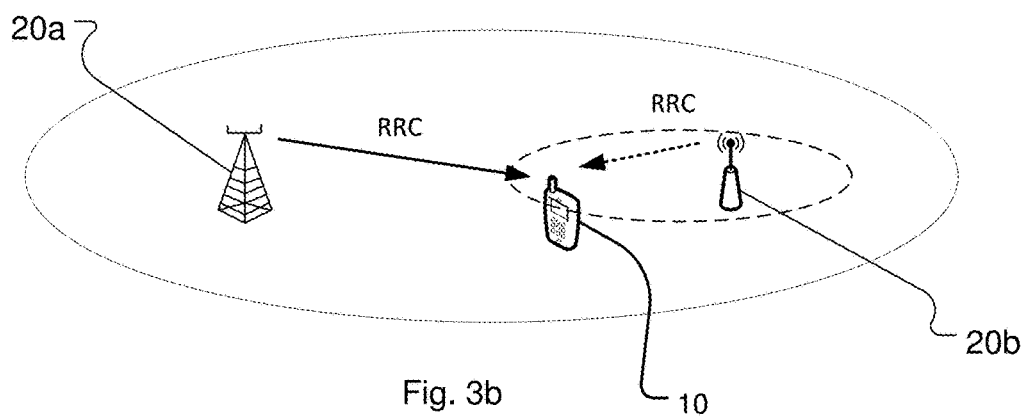
FIG. 3b illustrates the basic idea of RRC Diversity.
Figure 3C:
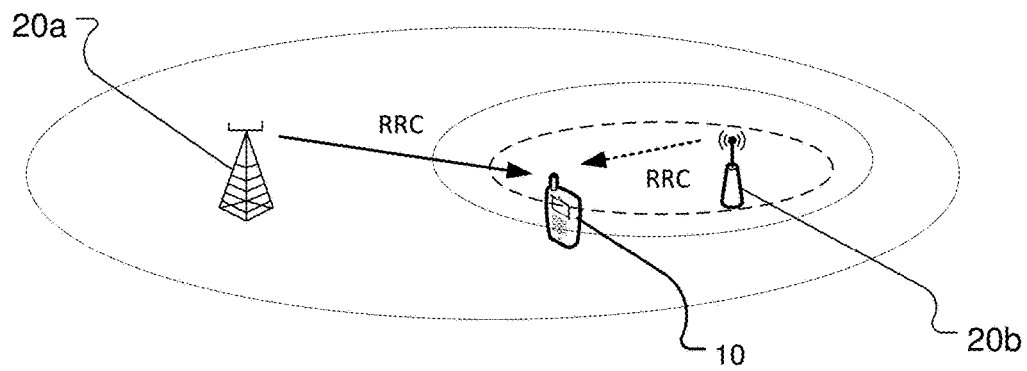
FIG. 3c illustrates the handover region between macro and pico cell where RRC diversity can be applied.

A control plane dual connectivity concept has been proposed for LTE Release 13. Improved mobility robustness was initially seen as a major driver for dual connectivity for intra-frequency deployments, therefore an RRC diversity concept was developed. The idea is to support RRC signaling communication via both the MeNB and the SeNB link, with the UE as illustrated in FIG. 3b.

During the study item phase, the focus has been on deployments where the UE having a dual connectivity would have a link with a macro cell and another with a small cell (Heterogeneous deployment). In addition to this, two scenarios have been evaluated, firstly intra-frequency and secondly inter-frequency. Assuming the heterogeneous deployments described earlier, RRC diversity provided major gains only in the first scenario. Since the same frequency scenario was not prioritized in dual connectivity for Release 12 (3GPP TS 36.300 version 12.3.0 Release 12), RRC diversity was not included in the Release 12 version of dual connectivity, and thus it remains a candidate for Release 13, both benefiting the intra-frequency scenario as well as the inter-frequency scenario.

Mobility robustness can be improved by applying RRC diversity to handover related signaling such as UE measurement reports and RRC-reconfiguration requests ("handover commands"). Preceding a handover situation, the UE can be ordered to enter (and later leave) the RRC diversity-state based on radio measurements, and then by connection reconfiguration. Since the UE is able to receive RRC messages via two links during the diversity mode, a radio link monitoring (RLM) scheme could be envisaged where the UE only triggers radio link failure (RLF) if both links fail. This way, out-of-sync consequences of a single link failure could be avoided.

Overall, the following advantages can be achieved with control plane dual connectivity.

By using downlink diversity the Physical Downlink Control Channel used for Uplink grant, Downlink assignment and the Physical Downlink Shared Channel, PDSCH, for Handover command may be sent over either links, which implies a more robust system.

By using Uplink diversity dual links may also be available for Scheduling requests and Measurement reports.

A further advantage is so called Radio Link Failure (RLF) protection, while the UE could declare RLF only if both links are out of sync, since it maintains a radio link towards each of the eNodeBs.

As RRC diversity is implemented on a higher layer, it is able to address multiple potential mobility or handover failure issues at the same time, and thus it can be considered as a feature to help operators in lowering their effort in tuning their network to improve mobility robustness.

Benefits for mobility robustness have been shown only for the first scenario, i.e. the intra-frequency scenario, which led to a down-prioritization of this feature for the dual connectivity work in Release 12, which focused on the second scenario, i.e. the inter-frequency scenario.

Figure 4A:
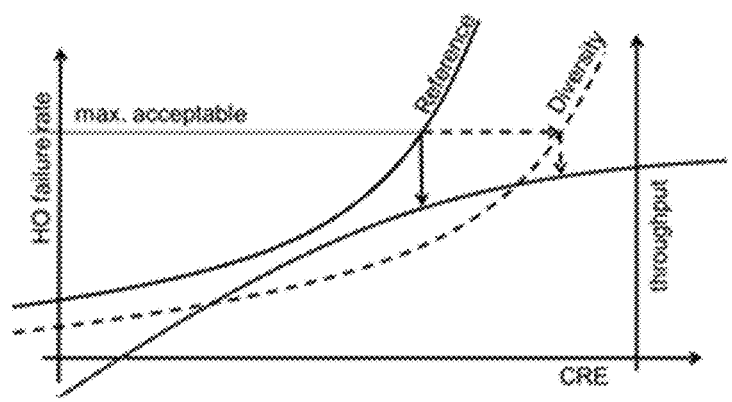
FIG. 4a shows handover failure rate and throughput.

In the first scenario, as illustrated in FIG. 4a, RRC diversity enables more aggressive handover parameter settings lowering the ping-pong rate or improving offloading to small cells by utilization of higher cell range expansion (CRE), while keeping the handover failure rate within reasonable bounds, as shown in FIG. 4a.

Figure 4B:
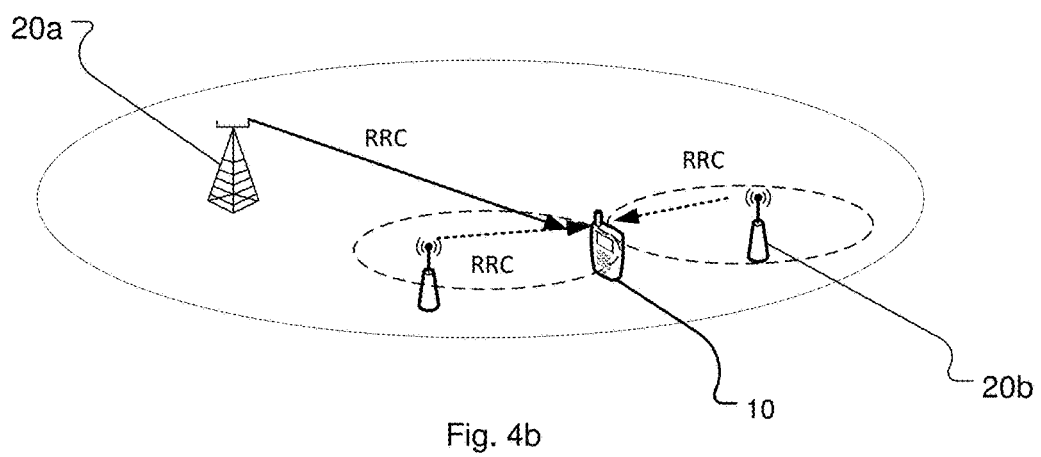
FIG. 4b illustrates intra-frequency handover between pico cells assisted by macro cell on separate frequency.

In the second scenario, it has been shown that if macro coverage cannot be guaranteed at all times, RRC diversity becomes beneficial, e.g. to additionally assist a pico-to-pico handover or a handover from the pico frequency layer to the macro cell. This is illustrated in FIG. 4b. As it will be explained later, this scenario is very relevant for 5G deployments, where dual connectivity may rely on a LTE link and a high frequency link associated with the new 5G air interface that might be more unstable due to the operation in very high frequencies.

Dual Connectivity and Small Cell Deployment

Another important area where inter-frequency RRC diversity might be applied is outdoor-indoor scenarios where a Macro MeNB provides large-scale outdoor coverage and Pico SeNB nodes are deployed indoor. With RRC diversity mobility robustness could be improved between the indoor Pico cells when Macro coverage is available.

In dense small cell deployments, the macro coverage layer may become overloaded if it is required to handle RRC signaling of all small cell users all the time (like envisaged in a user plane/control plane split implementation). There it may be beneficial to activate RRC diversity for pico users only temporarily. In this case the macro would become the SeNB.

This motivates making RRC diversity also available for the inter-frequency deployment scenario, for which Release 12 dual connectivity had been standardized.

Realization of RRC Diversity

For E-UTRAN, RRC diversity means that the RRC messages (SRBs signaling) are transmitted via two cells/eNodeBs to improve SRB transmission robustness (possibly in both uplink and downlink). This applies only to SRB1 and SRB2 (Dedicated Control Channel) signaling since RRC diversity operation will only be applicable in RRC connected mode.

The activation of RRC diversity operation could be based on the measurement report of some existing measurement events when the UE is seen to move close to the cell border. Another scenario to trigger RRC diversity could be depending on the cell load. That is, when the current serving cell becomes highly loaded while there are neighboring cells with very low load, then it is beneficial to enable the SRB transmissions via two cells to reduce signaling transmission failure rates.

Figure 5A:
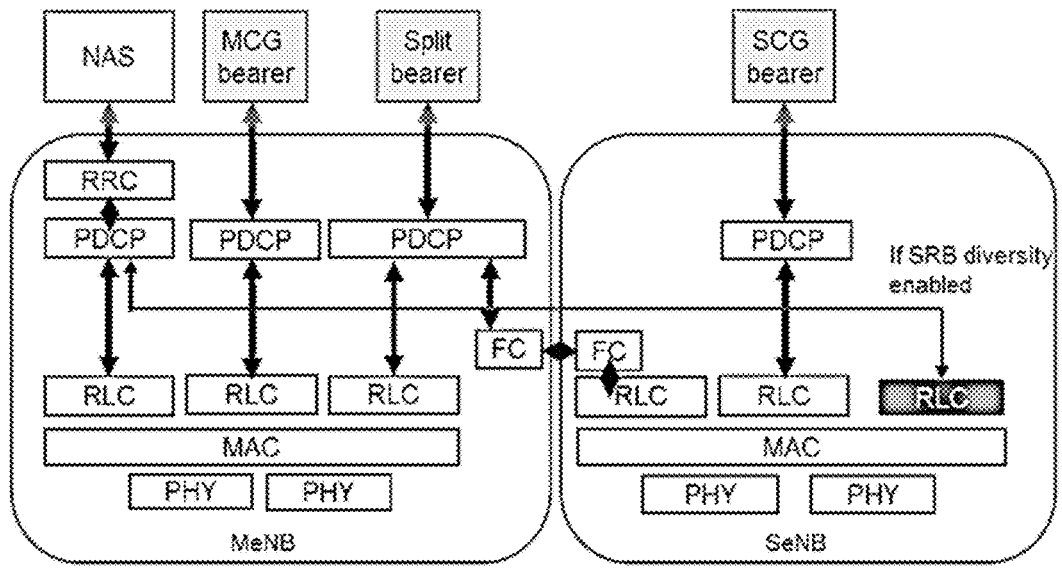
FIG. 5a shows the protocol architecture for Release 12 dual connectivity, but with added support for SRB diversity.

Three alternatives have been studied for how to realize the support of RRC diversity. The first alternative is an extension of Release 12 dual connectivity. FIG. 5a illustrates this alternative.

This alternative intends to introduce similar functionality as for Release 12 dual connectivity architecture (i.e. supporting 3 component carriers) for Data Radio Bearer, DRB, split bearer in order to support Signaling Radio Bearer, SRB, diversity.

In this alternative DL SRB transmission diversity reuses the same principle as for DRB split bearer. UL RB bearer split is not supported in Release 12 dual connectivity. Thus, UL SRB diversity functionality needs to be introduced.

Both the Radio Resource Control, RRC, and the Packet Data Convergence Protocol, PDCP, are anchored in the MeNB. So in the DL the MeNB creates two PDCP copies of the same RRC message that was generated by MeNB and forwards them to the RLC entities of the two eNodeBs (via X2-U to SeNB). The UE is configured by the MeNB with two RLC entities for SRB receptions. It will be up to the MeNB to decide to which eNodeB, possibly both, the DL PDCP Protocol Data Units (PDUs) are submitted. The UE PDCP entity needs to support duplicate detection/discard.

For the UL the UE creates one or two copies, based on the MeNB configuration, of the PDCP PDU of the same UL RRC message and submits to the corresponding UL RLC entities. The SeNB needs to support and be configured by the MeNB to receive UL SRB transmissions. Then the SeNB forwards the received RLC SDUs to PDCP located in the MeNB, which needs to support duplicate detection/discard.

Figure 5B:
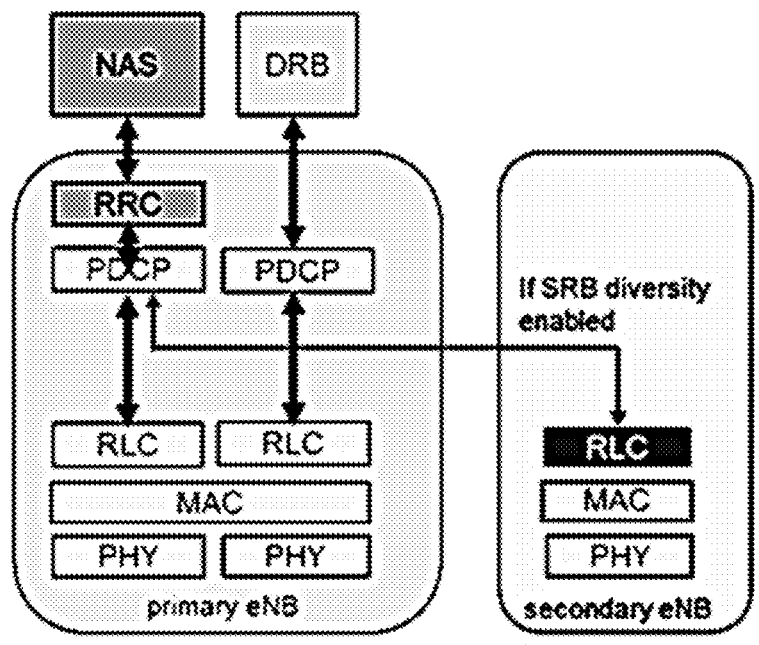
FIG. 5b shows the protocol architecture for the split bearer like implementation of RRC diversity.

The second alternative is also a split bearer like SRB transmission diversity, wherein the control plane is split on up to 3 bearers, which is the number of component carriers supported in LTE Release 12. This alternative is the same when it comes to handling SRB, but is different from the first alternative, because it does not support full dual connectivity from the data plane. FIG. 5b illustrates this alternative.

Hence, from implementation point of view, the network may decide to support the SRB transmission diversity without the complete split bearer implementation for DRBs. In this case, a simplified dual-connection with basic setup and configuration of secondary cell/eNodeB would be possible.

In this alternative, the secondary cell/eNodeB only supports the necessary Radio Link Control/Media Access Control/Physical Layer (RLC/MAC/PHY) configuration. No UE capability exchange and configuration negotiation needed between primary cell/eNodeB and secondary cell/eNodeB. The UE complexity to support SRB transmission diversity, compared with alternative 1, could also be reduced correspondingly. The procedures for SRB diversity operation are otherwise similar to the first alternative.

Figure 5C:
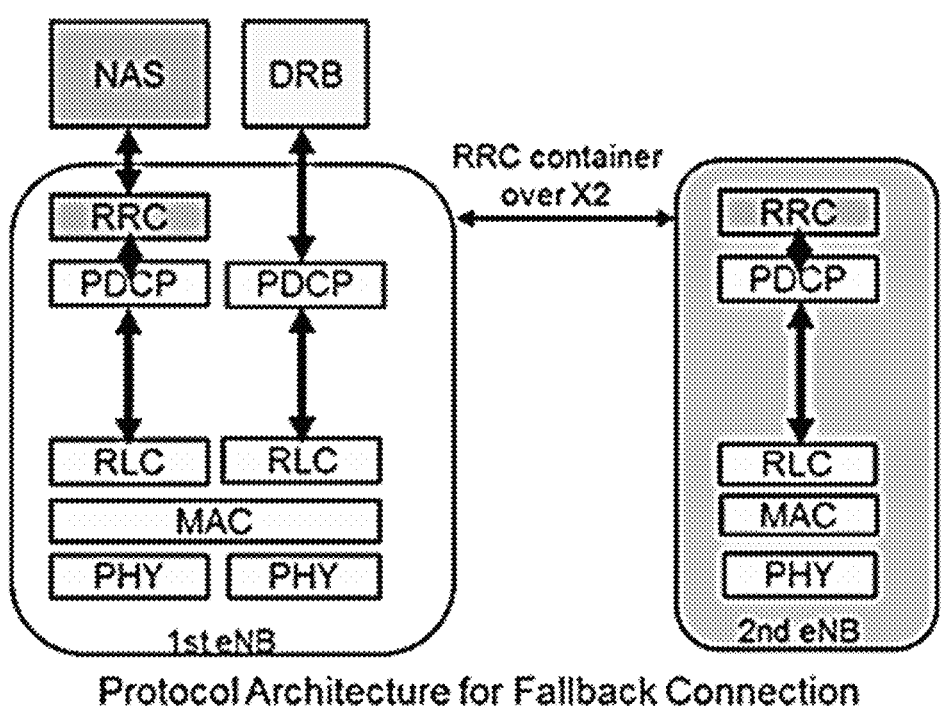
FIG. 5c shows the protocol architecture for the fallback connection with two independent connections and inter-eNodeB signaling over X2.

The third alternative is a fallback connection for mobility robustness. FIG. 5c illustrates this alternative.

A more flexible way to support SRB transmission diversity is to set up two independent connections with two cells/eNodeBs as shown in the figure below. RRC connections could be managed separately by each cell/eNodeB. But some coordination w.r.t measurement configuration/reporting and handover signaling may be needed to avoid conflicts. The UE keeps connections with two cells/eNodeBs until the associated eNodeB releases the connection or eventually the UE has moved to another cell and the target cell after handover decides to release the secondary connection.

Beamforming and 5G Mobility Concepts

Massive Beam forming is among the key features of the new 5G air interface.

One of the main differences of the concept, compared to the LTE design, is that the reference signals, called therein Mobility Reference Symbols (MRS), are only transmitted from the neighbor beam candidates on demand. In other words, the target node having the current active beam detects potential link quality degradation with its beam(s) and, upon this detection, needs to activate the transmission of UE-specific MRSs.

Figure 6:
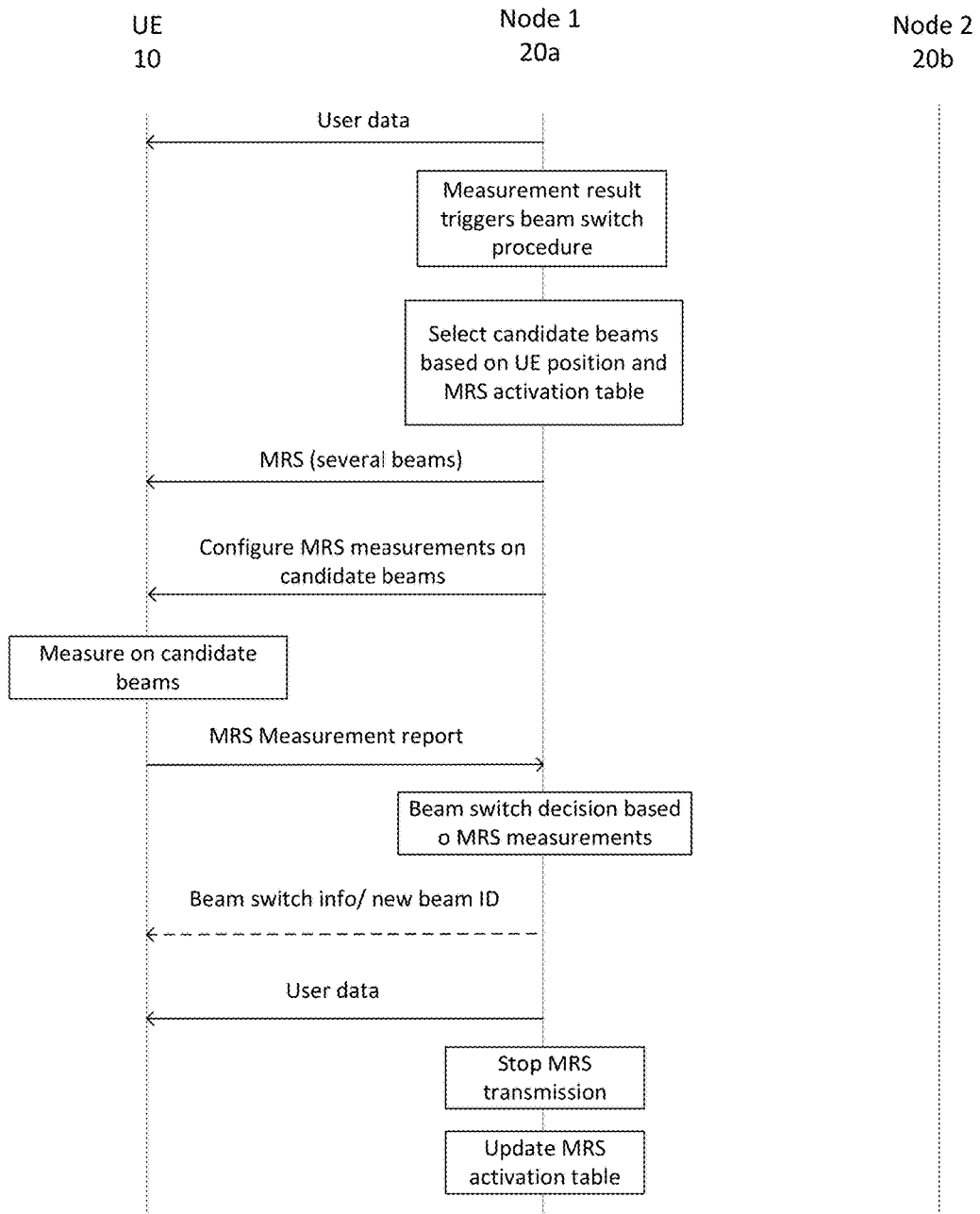
FIG. 6 illustrates intra-node beam mobility.

The radio link (RL) degradation detection event is also defined based on a threshold per quality measurement such as Channel State Information (CSI), Reference Signal Received Power (RSRP), Signal to Noise and Interference Ratio (SINR) estimation, so that when the reported measurements (or estimations, when assuming reciprocity in a Time Division Duplex (TDD) mode) are below the threshold the MRS transmission needs to be activated in certain candidate beams for that UE. If the candidate beams are within the same node, no interface information is needed. This is referred to as intra-node Beam Mobility. FIG. 6 show the signaling sequences for the intra-node mobility case.

However, if the beam to be activated belongs to another node, this is activated over some inter-node interface, such as X2 Application Protocol (X2AP) signaling.

One of the main purposes of this on-demand MRS activation is energy efficiency and interference reductions, both part of what is also called a lean design.

Figure 7:
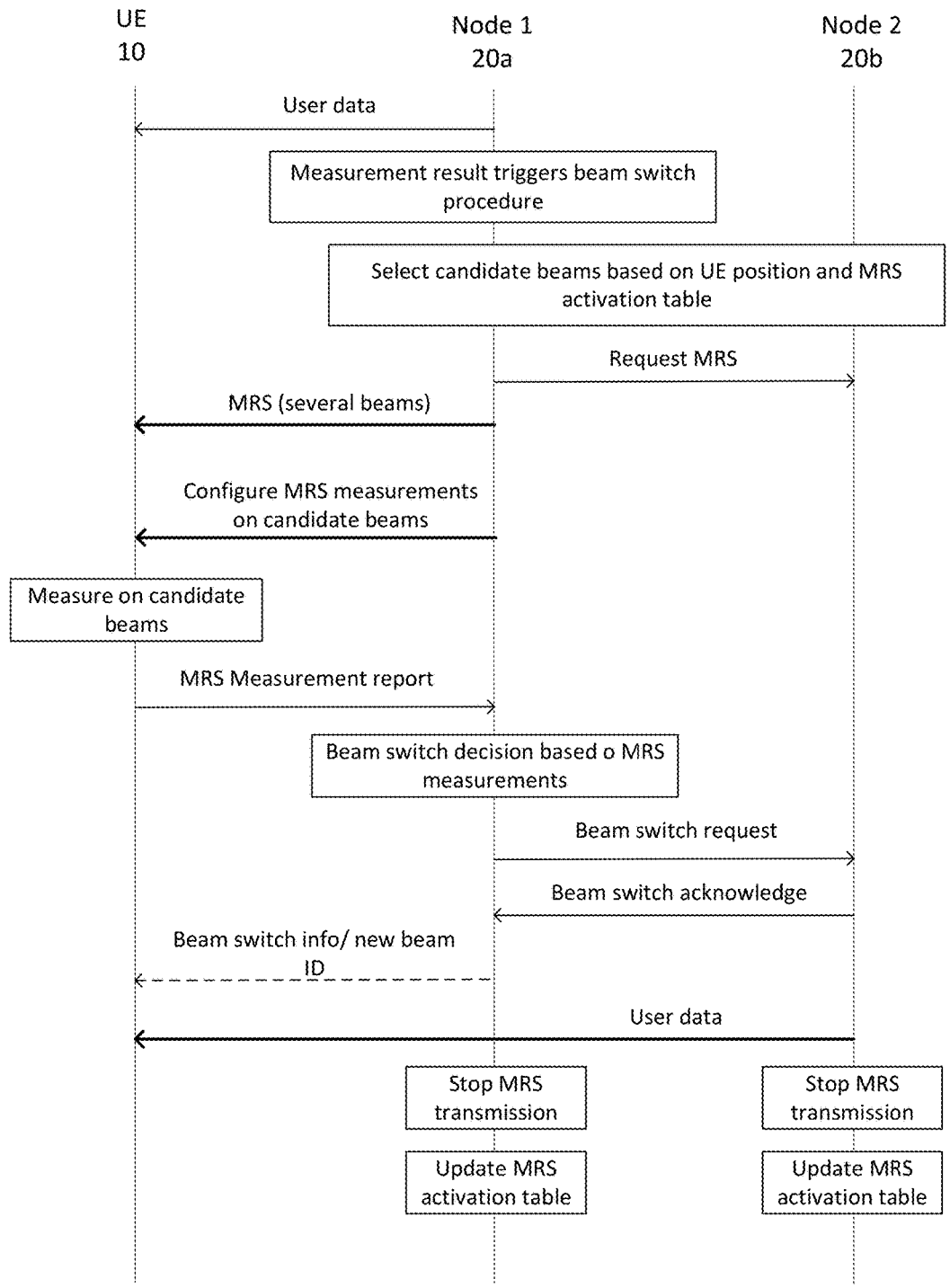
FIG. 7 illustrates inter-node beam mobility.

FIG. 7 shows the signaling sequences for inter-node mobility. Notice that in the inter-node mobility additional signaling over the inter-node interface is required.

Integration Between LTE and the New 5G Air Interface

A tight integration between the new 5G air interface (maybe its variants, if multiple) and LTE evolution is envisioned for the 5G Radio Access Network (5G RAN) architecture, enabling the potential for Dual Connectivity which could be seen as an extension of the Dual Connectivity feature to multiple air interfaces (or variants). Multi-connectivity becomes more important in this scenario since the new air interface may operate in high frequencies where coverage is spottier due to challenging propagation conditions.

The dual connectivity concept for LTE/5G RAN, may at least be expanded in two important ways. Firstly, dual connectivity between access nodes of different Radio Access Technologies, RATs is enabled. This concerns in particular a combination of access nodes using LTE and 5G RAN respectively, where 5G RAN uses a RAT which is different from LTE, but designed for tight integration/cooperation with LTE access nodes and networks. In addition, 5G RAN will assumedly (at least initially) be designed for and deployed in higher frequency bands than LTE.

Secondly, dual connectivity, also in terms of split bearer, is enabled not only for the user plane but also for higher layer signaling, such as RRC signaling. This has been considered for LTE too, but there has, at least so far, not been enough traction around this topic to progress it.

However, with the assumedly great difference in offered data rates between LTE and 5G RAN, sending user plane data through both accesses would add little throughput compared to just sending through 5G RAN. The gain may be further reduced if also the latency differs a lot between the two accesses. Thus, whenever 5G RAN is available, this access should be used for the user plane, if the throughput is to be optimized, and (preferably fast) handover to LTE should be used whenever the 5G RAN access is lost.

Notably, research about interworking between LTE and 5G RAN concludes that in the LTE-5G RAN case there is much less to benefit from dual connectivity (maybe in particular the split bearer approach) for the user plane than for the control plane. The reason is that, the control plane, e.g. the RRC signaling, can benefit from increased robustness/resilience. This is less important for the user plane, where increased throughput would be the main driver for most applications and scenarios.

Relaxed Measurement Reporting

As discussed above, dual connectivity for control signaling, in particular RRC signaling, provides a more robust or more resilient signaling connection. The same robustness/resilience may be provided also in the inter-RAT (LTE/5G RAN) scenario of dual connectivity for LTE, if dual connectivity in LTE is expanded to include control signaling, e.g. RRC connections.

Hence, using dual connectivity for the RRC connection makes it more robust/resilient to loss of connection in one of the involved cells or to one of the involved access nodes. Since the user plane connection would typically not be in dual connectivity mode, the user plane would however still be sensitive to loss of connection. However, the robust/resilient RRC connection, which remains even when the user plane connection is lost, can be used to quickly re-establish the user plane connection in the other of the involved cells or access nodes. This may be achieved e.g. through an RRCConnectionReconfiguration message or a similar message, potentially triggered by an RRCMeasurementReport or some other indication from the UE. Thus, a single RRC message exchange (e.g. RRCConnectionReconfiguration-RRCConnectionReconfigurationComplete) is enough to re-establish the user plane connection and this makes it swift enough to make the interruption negligible. In the proposed solution we leverage this fast re-establishment mechanism to allow increasing the risk for connection loss e.g. in conjunction with handover, and read benefits thereof in terms of decreased UE energy consumption, better resource utilization and reduced interference.

This disclosure proposes that when entering dual connectivity mode for the RRC connection for a UE, the base station maintaining the RRC context (e.g. an eNodeB) reconfigures the measurement reporting for the UE, so that a more relaxed measurement reporting is achieved.

The proposed methods of measurement reporting will now be described, referring to FIG. 8. FIG. 8 discloses a method, performed in a wireless device in a wireless communication system, for reporting measurements. One possible scenario is that the method is performed in a wireless device 10 located at the cell border, as shown in 3b. Hence, the wireless device 10 is then served by one eNodeB 20a. The wireless device is in dual connectivity with eNodeB 20b. Hence, the wireless device 10 has two radio links for the control plane as discussed above, one to each of the eNodeBs 20a, 20b.

The proposed technique is relevant in the context of dual connectivity or multi-connectivity. However, for simplicity, the solution is described only in terms of dual connectivity, but the same solution can be applied also in the multi-connectivity case.

Furthermore, the proposed technique is mainly described referring to one scenario e.g. 5G, with tight integration between LTE and 5G RAN, which assumedly is an inter-frequency scenario (although intra-frequency deployment scenarios cannot be completely ruled out). However, it should be noted that the invention is applicable to other scenarios too, such as RRC diversity in LTE, which may include both inter- and intra-frequency scenarios.

The proposed method comprises the step of receiving, S1, from a radio network node, information defining at least one further measurement report setting for measurement reporting in a control plane multi connectivity mode. The measurement report setting may be received with the regular measurement report configuration means, in LTE e.g. using an RRCConnectionReconfiguration message. The measurements, to which the measurements report setting apply, indicate e.g. signal level and/or quality and are used e.g. for cell or beam selection at hand over.

The at least one further measurement report setting corresponds to a more relaxed measurement reporting than a first measurement report setting, which is available to the wireless device. The settings may be varied in different ways. For instance a signal strength/quality threshold that triggers a measurement report may be different or the time to trigger (TTT) that stipulates how long the threshold trigger condition must remain until the UE actually sends a measurement report (i.e. if the threshold trigger condition is no longer valid when the TTT expires the UE does not send any measurement report). Alternatively the number of measurement objects to be reported may differ. If a UE is configured to send periodic measurement reports, the measurement report period can be different. Furthermore, in an inter-frequency and/or inter-RAT case discussed above, the base station can configure less frequent measurement gaps.

More relaxed implies requiring "less effort" e.g. in terms of less time, less power consumption, less radio resources or less hardware resources. In other words, by varying parameters such as "thresholds for report triggering" and "time to trigger a measurement report" and "what to measure on", the measurements and reporting thereof may require less resources e.g. in terms of power or hardware.

One core essence of the solution is to leverage the fast user plane reestablishment enabled by control plane dual connectivity, in particular for the RRC layer to save UE energy and radio resources and reduce interference through relaxed measurement report configuration for a UE for which the RRC connection is in dual connectivity mode, optionally on condition that selected other relevant circumstances are also favorable.

In a next step the wireless device 10 is selecting S2 one of the first and further measurement report settings based on a determination of a control plane connectivity mode of the wireless device; wherein the wireless device is in the control plane multi connectivity mode when the wireless device is using multiple radio links for the control plane. Stated differently, the wireless device detects that the UE has several radio links for the control plane connection. The wireless device then typically evaluates whether more relaxed measurement reporting may be feasible. The control plane signaling uses e.g. Radio Resource Control (RRC) protocol.

According to some aspects the selecting S2 is based on at least one further criterion. Or in other words, the relaxed measurement report configuration may of course also be subject to other circumstances.

For instance, if measurement reports indicate that the UE is approaching a cell border, the base station may (although not necessarily) choose to reconfigure the UE with a less relaxed configuration. Hence, according to some aspects, the further criterion comprises at least one of the following parameters: a distance to cell border, speed, timing advance, transmission power, geographical location and Radio Access Technology.

Another circumstance that may motivate changing back to less relaxed measurement report configuration (or avoid the relaxed measurement report configuration in the first place) could be that the UE is located in an area, in which historically many radio link failures have occurred. Yet other circumstances that may be relevant include the speed with which the UE is moving (which may be estimated from e.g. Doppler shift measurements, timing advance (e.g. time of arrival) measurements and/or angle of arrival measurements), timing advance, UE transmission power, UE power headroom, or how fast or widely reported measurements vary. High speed or fast or widely varying reported measurement values may be basis for the base station to avoid relaxed measurement report configuration for the UE.

Thus, the selecting S2 may be done in different ways. For example the selecting S2 implies selecting one of the at least one further measurement report settings if the difference between the latency of the radio links for the control plane is above a threshold. The benefits of relaxed measurement reporting configuration may depend on the connectivity scenario. Assume a scenario where a UE is in control plane dual connectivity mode in LTE and 5G RAN but single connectivity for the user plane. Considering whether to configure the UE with relaxed measurement reporting configuration (to provide input to user plane handover decisions), may then depend on in which RAT the user plane is currently connected.

According to some aspects, the wireless device performs S3 measurements in accordance with the selected measurement report settings. Alternatively, the measurements are performed independent on the measurement report settings. It is also possible that the measurements are already performed and that the measurement report settings only affects the reporting.

The method further comprises the step of reporting, S4, measurements in accordance with the selected measurement report setting, to the radio network node.

Different ways of selecting the different or relaxed settings will now be discussed. The selecting S2 typically involves applying rules in order to determine when to apply the first and further measurement report settings. According to some aspects, the received information comprises rules defining when to apply the first and further measurement report settings. Hence, according to some aspects, the method comprises receiving S1b information defining rules defining when to apply the further measurement report settings. It is also possible that the rules are predefined in the wireless devices. Then the method comprises obtaining S1c the rules e.g. from a memory. The rules may also be broadcasted or in any other way made available to the wireless devices.

A UE is for example configured by the network with two or more measurement reporting configurations, where one configuration is the active configuration. The UE could then be configured to autonomously change the active configuration to another configuration when entering and/or leaving dual connectivity mode.

Other ways to configure the UE with more or less "semi-autonomous" selection or adaptation of measurement reporting configuration include letting the UE take dynamic conditions into account. For instance, the UE may be configured with two measurement reporting configurations, e.g. one relaxed and one non-relaxed and the choice of which to use. Below follow examples of conditions that the UE may take into account. The rules may define which conditions to take into account.

In one example, if measurements indicate that the UE is close to or approaching a cell border, one (relaxed) measurement reporting configuration is used, otherwise another (non-relaxed) measurement reporting configuration is used.

In another example, if the UE is moving with a speed above a certain threshold (which may be detected e.g. through GPS measurements), one (e.g. non-relaxed) measurement reporting configuration is used, while another (e.g. relaxed) measurement reporting configuration is used in conjunction with lower speeds.

In a further example the timing advance the UE is configured with may be used to control selection of measurement configuration to use. For instance, if the timing advance is above a certain threshold, the UE uses one (e.g. non-relaxed) measurement configuration, while another (e.g. relaxed) measurement configuration is used when the timing advance is smaller. The rationale for this may be e.g. that eNodeB is aware (through configuration or experience from self-learning) of the size of the cell (of which the maximum timing advance may be a measure) and thus may configure the UE to use the timing advance as a means to detect closeness to the cell border and consequent choice of measurement reporting configuration.

In another example, the required UE transmission power may be a parameter that controls which measurement reporting configuration to use. For instance, the eNodeB may configure the UE to use one (e.g. non-relaxed) measurement reporting configuration when the required UE transmission power is above a certain threshold (or alternatively, when the UE power headroom is below a certain threshold), while another (e.g. relaxed) measurement reporting configuration is used when the required UE transmission power is below a certain threshold (or alternatively, when the UE power headroom is above a certain threshold).

In a last example, the eNodeB can include definitions of one or more geographical areas in the measurement reporting configurations, such that the UE selects the measurement reporting configuration to use based on presence or non-presence in these areas (which may be detected e.g. through GPS measurements). The rationale may be e.g. that the eNodeB historically has recorded frequent radio link failures in certain areas and in such areas non-relaxed measurement reporting configurations may be preferable.

The measurement reporting configuration is according to some variants of this disclosure more dynamic and leaves a greater responsibility to the UE. In other words, the same measurement reporting configuration may be used both when the UE is in control plane dual connectivity mode and when it is not, but the UE would "scale" the configuration (e.g. scale the thresholds and/or TTT) to make it more relaxed when it is in control plane dual connectivity mode. Optionally, this scaling may be used only in one of the RATs or may be different in the two RATs. The scaling and the scaling factor(s) to use would preferably be configured by the eNodeB together with the other measurement reporting configuration data, but it would also be possible to convey scaling factor(s) via the broadcasted system information (e.g. in an LTE cell of a main eNodeB).

The solution has so far been described in relation to handover between cells, but the concept is of course equally applicable to beam switching in a beam forming based system as discussed under the heading "Beamforming and 5G Mobility concepts" above.

This variant of the proposed technique comprises the same steps as discussed above. However, the multiple radio links correspond to different beams instead of to different cells belonging to different radio network nodes 20.

In one example embodiment, upon the detection or triggering of RRC diversity (i.e. dual/multi connectivity mode) from multiple beams (from the same node) thresholds for the activation of mobility reference symbols (MRS) in candidate neighbor beams are adjusted to more relaxed values (implementation relying on the flow signaling shown in the background).

In another example embodiment, upon the detection or triggering of RRC diversity (i.e. dual/multi connectivity mode) for a given UE from multiple beams (that can be from the same node or from a different node) the number of candidate neighbor beams can be reduced since resilience is higher with RRC diversity. Therefore, fewer neighbors will need to activate their MRSs and the UE would need to measure fewer neighbors' beams.

The corresponding methods performed in a network node for controlling measurement reporting, are now described referring to FIG. 9.

The method comprises sending S12, to a wireless device, information defining at least one further measurement report setting for measurements in a control plane multi connectivity mode; wherein the at least one further measurement report setting corresponds to more relaxed measurement reporting than a first measurements report setting for measurement reporting in a control plane single connectivity mode, which is available to the wireless device.

More specifically, the base station can for instance modify a signal strength/quality threshold that triggers a measurement report as well as increase the time to trigger (TTT) that stipulates how long the threshold trigger condition must remain until the UE actually sends a measurement report (i.e. if the threshold trigger condition is no longer valid when the TTT expires the UE does not send any measurement report). The base station may also reduce the number of measurement objects to be reported. If a UE is configured to send periodic measurement reports, the measurement report period can be increased. Furthermore, in the inter-frequency and/or inter-RAT case the base station can configure less frequent measurement gaps. The reconfiguration may be performed with the regular measurement report configuration means, e.g. using an RRCConnectionReconfiguration message.

According to some aspects, the method comprises receiving S13 measurements in accordance with the measurement report settings.

According to some aspects, the method comprises using the measurements for handover selection or beam switching.

According to some aspects, the method comprises determining S11a whether the wireless device is in the control plane multi connectivity mode; wherein the wireless device is in the control plane multi connectivity mode when the wireless device is using multiple radio links for the control plane. Then the sending S12 implies configuring S12a the wireless device with the one or more further measurement report settings for use when reporting S13 measurements, based on the determination.

Stated differently, the base station maintaining the RRC context (e.g. an eNode) may configure the UE with relaxed measurement reporting configuration when the user plane is connected via 5G RAN, but not when the user plane is connected via LTE (i.e. the base station would reconfigure the UE after each RAT switch for the user plane). The rationale for this behavior would be that when connected via LTE, it is desirable to switch as soon as possible to the higher throughput of 5G RAN and hence it should be avoided to risk delaying a handover because of relaxed measurement reporting configuration. When connected via 5G RAN the situation is the opposite and therefor the benefits of relaxed measurement reporting configuration takes the upper hand. The base station of course has the option to configure a UE with the same, or similar, measurement reporting configuration, either relaxed or non-relaxed, for both RATs.

In another embodiment, the information defines one or more scaling factors that may be applied to the first measurement report setting in order to obtain the at least one further measurement report setting. This implies that, the base station maintaining the RRC context (e.g. an eNode) may configure the UE with two different measurement reporting configurations simultaneously—one to be used when the user plane is connected via LTE and another to be used when the user plane is connected via 5G RAN. The two configurations may be similar or different, e.g. a relaxed configuration to be used when connected via 5G RAN and a non-relaxed configuration to be used when connected via LTE. A benefit of this embodiment is that the base station does not have to reconfigure the UE after each RAT switch (i.e. after each handover of the user plane).

According to some aspects of this embodiment, the information comprises rules defining when to apply the first and further measurement report settings.

The embodiments may be varied in various ways, e.g. such that they apply only when the UE has its user plane connected through a specific one of the two RATs (assuming single connectivity for the user plane). Another possible variation, or generalization, is that the UE may be configured with more than two measurement reporting configurations to choose from based on e.g. one or more of the above dynamic conditions and wherein these conditions may be adapted to the presence of more than two measurement reporting configurations, e.g. by using multiple thresholds instead of a single threshold. Yet another example of a variation, or generalization, is that instead of selecting between two (or more) measurement reporting configurations, a single measurement reporting configuration may be "scaled" (e.g. scaling of report triggering thresholds or TTT) as a consequence of the dynamic parameters that are used above to create dynamic conditions. For instance, report triggering thresholds and/or TTT may be scaled by a scaling factor derived from the current (latest configured or used) timing advance. Different dynamic conditions may also be used in various combinations to form more complex conditions for selection or adaptation of measurement reporting configuration.

The decision whether to apply relaxed settings may be based on at least one further criterion. For example, according to another aspect of this disclosure the presence of control plane dual connectivity is leveraged in a slightly different way in conjunction with measurement reporting configuration. In this embodiment the measurement reporting configuration may be relaxed by making a measurement report trigger condition a combination of conditions for the respective RATs. The purpose is to monitor the probability that control plane measurements can be conveyed through the combined dual connectivity legs. This means that poorer than usual channel qualities can be tolerated, because the chance of getting a message successfully across may still be sufficiently good for the combination of the dual connectivity legs. The trigger condition may for instance be formulated as an algorithm or formula, which takes channel quality related parameters from both radio channels into account (e.g. including the sum of received powers or the sum of SINR values or non-linear formulas or logical expressions involving such parameters, etc.).

Example Node Configuration

Figure 10A:
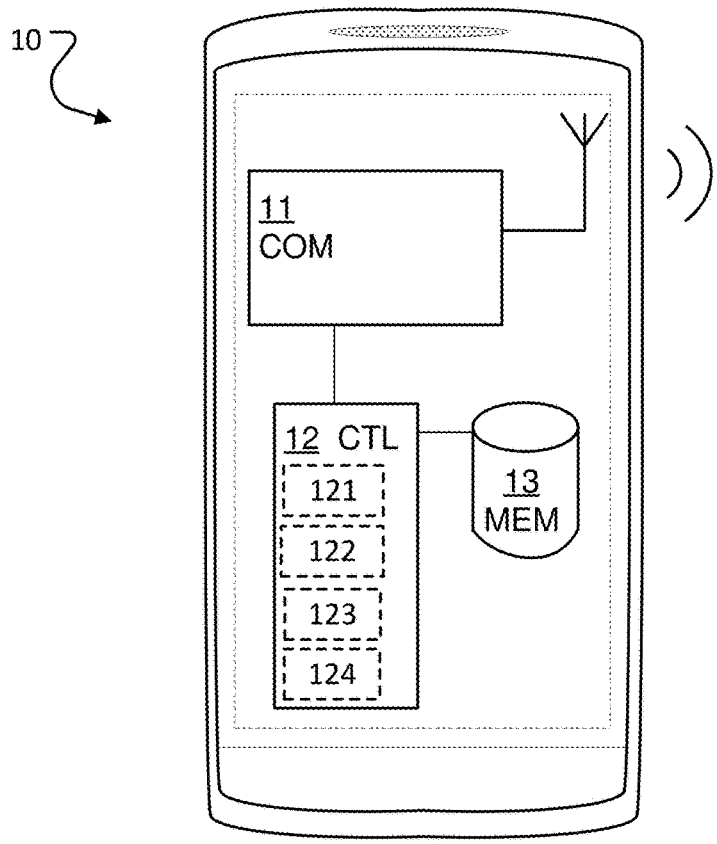
FIG. 10a is a block diagram a wireless device according to some exemplary embodiments.

FIG. 10a illustrates an example wireless device 10, according to some of the example embodiments, wherein the wireless device is configured for reporting measurements.

As shown in FIG. 10a, the wireless device 10 according to some aspects comprise a radio communication interface 11 configured to receive and transmit any form of communications or control signals within a network. It should be appreciated that the radio communication interface 11 may be comprised as any number of transceiving, receiving, and/or transmitting units or circuitry. It should further be appreciated that the radio communication interface 11 may be in the form of any input/output communications port known in the art. The radio communication interface 11 may comprise RF circuitry and baseband processing circuitry (not shown).

The wireless device 10 may further comprise at least one memory unit or circuitry 13 that may be in communication with the radio communication interface 11. The memory 13 may be configured to store received or transmitted data and/or executable program instructions. The memory 13 may also be configured to store any form of beam-forming information, reference signals, and/or feedback data or information. The memory 13 may be any suitable type of computer readable memory and may be of volatile and/or non-volatile type. According to some aspects, the disclosure relates to a computer program comprising computer program code which, when executed in a first wireless device, causes the first wireless device to execute any aspect of the example node operations described above.

The wireless device 10 may further comprise processing circuitry 12 which may be configured to cause the wireless device 10 to receive, from a radio network node, information defining at least one further measurement report setting for measurement reporting in a control plane multi connectivity mode; wherein the at least one further measurement report setting corresponds to more relaxed measurement reporting than a first measurement report setting for measurement reporting in a control plane single connectivity mode, which is available to the wireless device. The processing circuitry 12 is further configured to select one of the first and further measurement report settings based on a determination of a control plane connectivity mode of the wireless device, wherein the wireless device is in the control plane multi connectivity mode when the wireless device is using multiple radio links for the control plane and to report, to the radio network node, measurements in accordance with the selected measurement report setting.

According to some aspects, the selecting S2 is based on at least one further criterion. According to some aspects, the further criterion comprises at least one of the following parameters: a distance to cell border, speed, timing advance, transmission power, geographical location and Radio Access Technology. According to some aspects, more relaxed implies requiring less time, less power consumption, less radio resources or less hardware resources.

The processing circuitry 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

According to some aspects the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

Hence, according to some aspects, the processing circuitry 12 comprises a receiver module 121 configured to receive, from a radio network node, information defining at least one further measurement report setting for measurement reporting in a control plane multi connectivity mode; wherein the at least one further measurement report setting corresponds to more relaxed measurement reporting than a first measurement report setting for measurement reporting in a control plane single connectivity mode, which is available to the wireless device. The processing circuitry 12 further comprises a selecting module 122 configured to select one of the first and further measurement report settings based on a determination of a control plane connectivity mode of the wireless device, wherein the wireless device is in the control plane multi connectivity mode when the wireless device is using multiple radio links for the control plane. According to some aspects the processing circuitry also comprises a measuring module 123 configured to perform measurements in accordance with the selected measurement report settings. The processing circuitry also comprises a reporting module 124 configured and to report, to the radio network node, measurements in accordance with the selected measurement report setting.

Within the context of this disclosure, the terms "wireless terminal" or "wireless device" encompass any device which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

Figure 10B:
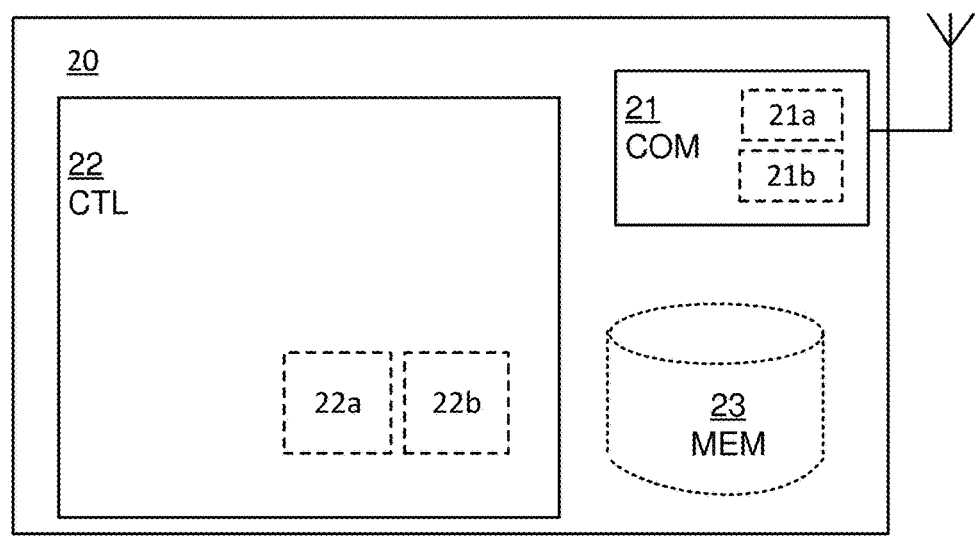
FIG. 10b is a block diagram of a network node according to some exemplary embodiments.

FIG. 10b illustrates an example network node 20a, configured for controlling measurement reporting of a wireless device, according to some of the example embodiments. The radio network node 20 is typically a radio network node or base station, such as an eNodeB in LTE. The radio network node 20 comprises communication interface 21 configured for communication with a wireless device 10. The communication interface 21 comprises a radio communication interface 21a and a network communication interface 21b. The radio network node 20 further comprises a memory 23 and processing circuitry 22.

The radio communication interface 21a is configured for communication with wireless devices within reach of the radio network node over a radio communication technology. The network communication interface 21b is configured for communication with other network nodes. This communication is often wired e.g. using fiber. However, it may as well be wireless. The connection between network nodes is generally referred to as the backhaul. The controller, CTL, or processing circuitry 22 may be constituted by any suitable Central Processing Unit, CPU, microcontroller, Digital Signal Processor, DSP, etc. capable of executing computer program code. The computer program may be stored in a memory, MEM 23. The memory 23 can be any combination of a Random Access Memory, and a Read Only Memory, ROM. The memory 23 may comprise persistent storage, which, for example, can be any single one or combination of magnetic memory, optical memory, or solid state memory or even remotely mounted memory.

According to some aspects, the disclosure relates to a computer program comprising computer program code which, when executed, causes a network node to execute the methods described above and below.

The processing circuitry 22 is configured to perform the proposed methods of controlling measurement reporting settings of a wireless device. Hence, the processing circuitry 22 is configured to send, to a wireless device, information defining at least one further measurement report setting for measurements in a control plane multi connectivity mode; wherein the at least one further measurement report setting corresponds to more relaxed measurement reporting than a first measurements report setting for measurement reporting in a control plane single connectivity mode, which is available to the wireless device. According to some aspects, the information comprises rules defining when to apply the first in step and further measurement report settings. According to some aspects, the information defines one or more scaling factors that may be applied to the first measurement report setting in order to obtain the at least one further measurement report setting.

According to some aspects the processing circuitry 22 comprises modules configured to perform the methods described above. The modules are implemented in hardware or in software or in a combination thereof. The modules 22a, 22b are according to one aspect implemented as a computer program stored in a memory 23 which run on the processing circuitry 22.

According to some aspects, the processing circuitry 22 comprises a determining module 22a, configured determine whether the wireless device is in the control plane multi connectivity mode; wherein the wireless device is in the control plane multi connectivity mode when the wireless device has multiple radio links for the control plane connection.

According to some aspects, the processing circuitry 22 comprises a sender module 22b, configured to send, to a wireless device, information defining at least one further measurement report setting for measurements in a control plane multi connectivity mode; wherein the at least one further measurement report setting corresponds to more relaxed measurement reporting than a first measurements report setting for measurement reporting in a control plane single connectivity mode, which is available to the wireless device.

The invention claimed is:

1. A method, performed in a wireless device in a wireless communication system, for reporting measurements for radio links in the wireless communication system that are candidates for serving the wireless device, the method comprising:
   receiving, from a radio network node, information defining first and second measurement report settings, the second measurement report setting being more relaxed in comparison to the first measurement report setting;
   selecting the first measurement report setting responsive to determining that the wireless device has a single control plane connection to the wireless communication system;
   selecting the second measurement report setting responsive to:
      determining that the wireless device has two or more control plane connections to the wireless communication system; and
      further determining that the wireless device is not operating under one or more defined conditions that trigger use of the first measurement report setting; and
   reporting, to the radio network node, measurements in accordance with the selected measurement report setting.

2. The method according to claim 1, comprising performing measurements in accordance with the selected measurement report setting.

3. The method according to claim 1, wherein further determining that the wireless device is not operating under one or more defined conditions that trigger use of the first measurement report setting comprises determining at least one of:
   that the wireless device is not operating at a cell edge;
   that a speed of the wireless device is not above a defined speed threshold;
   that a transmission power of the wireless device is not above a defined transmission power threshold;
   that the wireless device is not operating in an area associated with a high incidence of radio link failure; and
   that the two or more control plane connections do not involve different radio frequencies or different radio access technologies.

4. The method according to claim 1, wherein, as compared to the first reporting setting, the second reporting setting requires at least one of: less time, less power consumption, fewer radio resources, and fewer hardware resources.

5. The method according to claim 1, further comprising receiving one or more criteria from the wireless communication system defining the one or more conditions that trigger use of the first measurement report setting.

6. The method according to claim 1, wherein the two or more control plane connections correspond to different cells or beams.

7. The method according to claim 1, wherein the two or more control plane connections comprise two or more Radio Resource Control (RRC) protocol connections.

8. The method according to claim 1, wherein the measurements indicate at least one of signal level and signal quality.

9. The method according to claim 1, wherein the information defines one or more scaling factors, and wherein the method further comprises the wireless device deriving the second reporting setting by applying the one or more scaling factors to the first reporting setting.

10. A wireless device comprising:
   transceiver circuitry configured to send and receive signals in a wireless communication network, including receiving signals for radio links that are candidates for serving the wireless device; and
   processing circuitry configured to:
   receive, from a radio network node in the wireless communication system, information defining first and second measurement report settings to use for making measurements on radio links that are candidates for serving the wireless device, the second measurement report setting being more relaxed in comparison to the first measurement report setting;
   select the first measurement report setting responsive to determining that the wireless device has a single control plane connection to the wireless communication system;
   select the second measurement report setting responsive to:
      determining that the wireless device has two or more control plane connections to the wireless communication system; and
      further determining that the wireless device is not operating under one or more defined conditions that trigger use of the first measurement report setting; and
   report, to the radio network node, measurements in accordance with the selected measurement report setting.

11. The wireless device according to claim 10, wherein the processing circuitry is configured to perform measurements in accordance with the selected measurement report setting.

12. The wireless device according to claim 10, wherein the processing circuitry is configured to determine that the wireless device is not operating under one or more defined conditions that trigger use of the first measurement report setting based on being configured to determine at least one of:

that the wireless device is not operating at a cell edge;

that the wireless device is not above a defined speed threshold;

that the wireless device is not above a defined transmission power threshold;

that the wireless device is not operating in an area associated with a high incidence of radio link failure; and that the two or more control plane connections do not involve different radio frequencies or different radio access technologies.

13. A method, performed in a radio network node configured for operation in a wireless communication system, for controlling measurement reporting of measurements made by a wireless device for radio links that are candidates for serving the wireless device, the method comprising:

defining one or more conditions that trigger reporting by the wireless device according to a first measurement setting that is less relaxed than a second measurement setting;

sending, to the wireless device, information defining the first and second measurement reporting settings, the first measurement report setting to be used by the wireless device when the wireless device does not have two or more control plane connections to the wireless communication system, and the second measurement report setting to be used by the wireless device when it has two or more control plane connections to the wireless communication system and is not operating under the one or more conditions that trigger use of the first measurement setting by the wireless device.

14. A radio network node comprising:

transceiver circuitry configured to wirelessly communicate with a wireless device; and processing circuitry configured to:

define one or more conditions that trigger reporting by the wireless device according to a first measurement setting that is less relaxed than a second measurement setting, said first and second measurement settings controlling reporting of measurements made by the wireless device regarding radio links that are candidates for serving the wireless device; and send, to the wireless device, information defining the first and second measurement reporting settings, the first measurement report setting to be used by the wireless device when the wireless device does not have two or more control plane connections to the wireless communication system, and the second measurement report setting to be used by the wireless device when it has two or more control plane connections to the wireless communication system and is not operating under the one or more conditions that trigger use of the first measurement setting by the wireless device.

* * * * *